United States Patent
Oomura

(10) Patent No.: US 7,973,756 B2
(45) Date of Patent: Jul. 5, 2011

(54) REFLECTION TYPE LIQUID CRYSTAL DISPLAY APPARATUS AND SUBSTRATE FOR REFLECTION TYPE LIQUID CRYSTAL DISPLAY

(75) Inventor: Masanobu Oomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/819,860

(22) Filed: Jun. 21, 2010

(65) Prior Publication Data

US 2010/0259710 A1    Oct. 14, 2010

Related U.S. Application Data

(62) Division of application No. 11/739,871, filed on Apr. 25, 2007.

(30) Foreign Application Priority Data

Apr. 27, 2006   (JP) ................................. 2006-123411
Apr. 13, 2007   (JP) ................................. 2007-106059

(51) Int. Cl.
  *G09G 3/36*       (2006.01)
(52) U.S. Cl. .............................. 345/100; 345/87; 345/98
(58) Field of Classification Search .................... 345/58, 345/87–104, 204–215
See application file for complete search history.

(56) References Cited

U.S. PATENT DOCUMENTS

| 6,853,419 | B2 | 2/2005 | Iwasa | 349/113 |
| 6,985,201 | B2 | 1/2006 | Iwasa et al. | 349/137 |
| 7,002,648 | B2 | 2/2006 | Iwasa | 349/113 |
| 7,022,648 | B2 | 4/2006 | Dean | 504/100 |
| 7,388,633 | B2 | 6/2008 | Iwasa | 349/113 |
| 2007/0241347 | A1 | 10/2007 | Ichikawa | 257/88 |
| 2007/0252796 | A1* | 11/2007 | Oomura | 345/87 |
| 2009/0303425 | A1 | 12/2009 | Ichikawa | 349/140 |

FOREIGN PATENT DOCUMENTS

| JP | 2004-309681 | 11/2004 |
| JP | 2006-30635 | 2/2006 |

* cited by examiner

*Primary Examiner* — Vijay Shankar
(74) *Attorney, Agent, or Firm* — Fitzpatrick, Cella, Harper & Scinto

(57) ABSTRACT

In order to provide a reflection type liquid crystal display apparatus where, even when the pixel size is small, the crosstalk between a signal line and an end of a capacitor can be decreased, thus resulting in a good output image, by forming a signal line 2 for transmitting an image signal to each pixel with a second metal layer, by placing a shield line 12 between a capacitor electrode 10 constituting a capacitor and the signal line 2 with a first metal layer, and by giving a fixed potential, shielding is provided to prevent occurrence of cross-talk. The capacitor is configured with a common electrode 11 and a capacitor electrode 10, having a diffusion layer formed on a semiconductor substrate. By placing the capacitor electrode having a diffusion layer formed on the semiconductor substrate and the common electrode having a fixed potential below the signal line, shielding is provided to prevent occurrence of cross-talk.

18 Claims, 14 Drawing Sheets

REFLECTION TYPE LIQUID CRYSTAL DISPLAY APPARATUS AND SUBSTRATE FOR REFLECTION TYPE LIQUID CRYSTAL DISPLAY

This application is a division of application Ser. No. 11/739,871, filed Apr. 25, 2007, the contents of which are incorporated herein by reference.

BACKGROUND OF THE INVENTION

1. Field of the Invention

The present invention relates to a reflection type liquid crystal display apparatus using an active matrix type driving system, a substrate for a reflection type liquid crystal, and a liquid crystal projector system. More particularly, the present invention relates to a reflection type liquid crystal display apparatus including a semiconductor substrate having a plurality of pixels disposed in a matrix thereon, each pixel including a switching element, a capacitor and an reflective electrode, and a light transmitting substrate having a light transmitting electrode formed thereon the reflective electrode facing the light transmitting electrode, a substrate for a reflection type liquid crystal display apparatus using a semiconductor substrate, and a liquid crystal projector system.

2. Description of the Related Art

In recent years, liquid crystal display apparatuses are widely spread for applications from compact display apparatuses to terminals of so called OA equipment (automated office equipment), in particular, in the office equipment, projection type liquid crystal display apparatuses where an image is projected on a large screen, are actively used.

With regard to such kinds of projection type liquid crystal display apparatus, there are two main types: a transmission type liquid crystal display apparatus and a reflection type liquid crystal display apparatus. In the former transmission type liquid crystal display apparatus, there is a problem in that, due to a switching element (transistor), a capacitor and a wiring provided to each of pixels, the transmission region of a pixel for transmitting a light reduces aperture ratio.

In the reflection type liquid crystal display apparatus, any region except for a region for insulating and isolating an pixel electrode for reflection of each pixel (hereinafter referred to as a reflective electrode) can be made as a reflective electrode. In addition, since a switching element, a capacitor, and a wiring which are required for driving an active matrix, can be arranged below the reflective electrode, the reflection type liquid crystal display apparatus has many advantages as compared to the transmitting type liquid crystal display apparatus, in compacting a liquid crystal display panel, high definition, and high brightness.

In general, in the above-mentioned reflection type liquid crystal display apparatus, a plurality of reflective electrodes connected to switching elements such as MOS transistors are arranged in a matrix on a semiconductor substrate (Si substrate). Moreover, the reflection type liquid crystal display apparatus has a configuration where a light transmitting common electrode facing to the plurality of reflective electrodes and to be common to all pixels, is placed, and further a liquid crystal is injected between the reflective electrodes of the semiconductor substrate and the common electrode. In such a reflection type liquid crystal display apparatus, by incidenting a light from the common electrode side and by corresponding the potential difference between the common electrode and the reflective electrode to an image signal and by controlling the orientation of the liquid crystal in each pixel, a reflected light is modulated.

In recent years, since high definition for the liquid crystal display apparatus has been required, and the reflection type liquid crystal display apparatus projects and displays an image on a large screen, needs of high definition pixels are big. Accordingly, if a high definition liquid crystal display apparatus is made by easygoing way of thinking, the chip size of the semiconductor substrate tends to be larger and larger. However, the large chip size directly leads to cost increase. Therefore, it is desirable to make the chip size as small as possible, and for this purpose, miniaturization of the pixel size is required.

In general, in consideration of reliability such as seizure, a voltage applied to the liquid crystal of a liquid crystal display apparatus is subjected to so called inversion driving where the voltage applied to the liquid crystal apparatus is reversed, for example, each frame. Therefore, a supply power voltage required to drive the liquid crystal display apparatus is required to be an order of 15 V (or more). In other words, this means that the withstanding voltages of pixels formed on a semiconductor substrate and elements (transistors and capacitors) constituting a periphery drive circuit, are required to be an order of 15 V (or more).

However, in order to ensure the withstanding voltage of each element, some amount of element size or element isolation space is required. In other words, although a small pixel size is required, from the design rule of element formation (definition of sizes such as a pixel size and element isolation space required when a device is formed), the size cannot be caused to be small. Accordingly, in order to cause the element size to be small, the capacitor of each pixel tends to be small.

However, since, if the capacitor is caused to be small, the quantity of an image is reduced and the image is susceptible to cross-talk from a signal line due to voltage drop caused by leakage from the capacitor end, the quantity of an output image will be reduced. Therefore, it is desirable for the capacitor to be as large as possible.

In order to cause the capacitor of the pixel to be large, the size of a capacitor electrode in the pixel should be as large as possible.

FIG. 9 is an example of a conventional pixel layout, and FIG. 10 is a cross-sectional view along line 10-10 of FIG. 9. This configuration is disclosed in Japanese Patent Application Laid-Open No. 2004-309681.

As a semiconductor substrate to be a base, a p-type monocrystal silicon substrate (hereinafter, referred to as a p-type Si substrate) is used, and on the substrate a gate line 201 formed with polysilicon is wired in a horizontal direction. Then, a part of the gate wiring is separated and acts as a gate of NMOS transistor to be a switching element. A source region 202 of a switching transistor to be a switching element is connected to a signal line 204 formed with a first metal layer via a source contact 203. A drain region 205 of the switching transistor is connected to a drain wiring 207 formed with the first metal layer via a drain contact 206. The drain wiring 207 is connected to a capacitor electrode 209 formed with polysilicon via a contact 208.

The counter electrode of the capacitor electrode 209 acts as an $N^+$ type diffusion layer formed on a silicon substrate by means of ion implantation, and the diffusion layer acts as a common electrode 210 being common to whole pixels. Moreover, an insulating film between the capacitor electrode 209 and the common electrode 210 is generally formed by means of the same process as the process of a gate oxide film forming NMOS transistor.

In FIG. 10, a p-type Si substrate 211 is illustrated, where, in the left side, an NMOS transistor acting as a switching element is formed between field oxide films 212a and 212b. A gate electrode (a part of the gate wiring) 201 of the NMOS transistor, a source region 202, and a drain region 205 are illustrated.

The source region 202 is connected to the signal line 204 formed with the first metal layer via the source contact 203. The drain region 205 is connected to the drain wiring 207 formed with the first metal layer via the drain contact 206. The drain wiring 207 is connected to the capacitor electrode 209 via the contact 208, and further connected to the reflective electrode 214 formed with a third metal layer via a through hole 213. Moreover, since the common electrode (Vcom electrode) 210 being the counter electrode of the capacitor electrode 209 is formed with an $N^+$ type diffusion layer, both sides thereof, similar to the NMOS transistor, are formed between the field oxide films 212b and 212c. Moreover, between the first metal layer and the reflective electrode 214, in order to shielding incident light from the gap between itself and a neighboring reflective electrode, a light shielding layer 215 formed with the second metal layer is placed. In addition, in the light shielding layer 215, at a position through which the through hole 213 is passed, in order to obtain electrical insulation, a hole is opened. In addition, in order to obtain the capacitor of the pixel as much as possible, a fixed potential is given to the shielding layer 215.

Although a liquid crystal layer 217 is not illustrated, it is inserted between liquid crystal common electrodes 216 at a predetermined gap, which are formed with a light transmitting substrate acting as a counter electrode of the reflective electrode 214 after a protection film is coated on the reflective electrode 214.

Since the change of the optical properties (change of polarization coefficient) of a liquid crystal occurs by the potential difference between the reflective electrode 214 and the liquid crystal common electrode 216, by controlling the potential of the reflective electrode 214 of each pixel, an image is formed.

SUMMARY OF THE INVENTION

In Japanese Patent Application Laid-Open No. 2004-309681, a first shield line 219 is provided between the signal line 204 and the drain wiring 207, in the same layer (a first metal layer) as the layer of the signal line 204 and the drain wiring 207. Moreover, to the first shield line 219 is given a potential being same as the potential of the common electrode 210. Furthermore, by also considering the effect of crosstalk from the signal line of a neighboring pixel, a second shield line 220 is also arranged to a side (right side in the figure) opposite to the side where the first shield line 219 is arranged. The second shield line 220 gives a GND potential and connected to a p-type substrate via a $P^+$ region in the pixel. Although, in this configuration, crosstalk affecting the drain wiring 207 by the signal line 204 including neighboring pixels, can be suppressed, since the signal line 204 passes through a portion above the capacitor electrode 209, the cross-talk is not eliminated. In other words, in order to cause the capacitor to be larger, a part of the capacitor electrode 209 is also made at the part below the signal line 204.

Here, what effect is given by cross-talk given by the signal line 204 to the end of the capacitor electrode 209, will be described.

When a predetermined line is in a selection state (a state where a gate line is in a high level and the switching transistor of the pixel is in an on state), each pixel in another line holds a pixel signal voltage for displaying the pixel in the capacitor thereof. At that time, image signal is written into the held capacitor on the predetermined pixel by the signal line via the switching transistor. At that time, as illustrated in FIG. 9, since a parasitic capacitor is present between the signal line 204 and the end of the capacitor 209, potential fluctuation occurs at the end of the electrode of a capacitor in a held state, via the parasitic capacitor. If the potential of the electrode of the capacitor in a held state is changed, optical properties of a liquid crystal is changed, and thereby, an original image cannot be expressed, thus resulting in significant degradation of image quality. This phenomenon is referred to as a cross-talk.

Evaluation pattern for measuring the cross-talk is performed using, for example, a nine-split screen (three-split in horizontal direction×three-split in vertical direction). When 100% of brightness is displayed on the center split screen, and a half tone brightness (for example, 10% of brightness) is displayed on the surrounding eight split screens, the cross-talk due to the parasitic capacity occurs at the interface of the brightnesses.

In order to avoid the cross-talk, it can be considered that a configuration where the capacitor electrode 209 formed with polysilicon, that is a capacitor, is not placed below the signal line 204 in other words, a capacitor is not formed. Using this layout, overlapping between the signal line 204 and capacitor electrode 209 is not present, thereby, the cross-talk given to the end of the capacitor electrode by the signal line 204 can be caused to be small, however, the capacitor becomes small. In this situation, when the size of the pixel is small, the retention capability of a pixel voltage degrades. When the retention capability is degraded, the image becomes an image whose contrast is small, thus resulting in degradation of the quality of the image.

In addition, between the signal line 204 and the reflective electrode 214, a light shielding layer 215 for shielding incident light from the gap between reflective electrodes, is placed. Since a fixed voltage is applied to the light shielding layer 215, and the light shielding layer 215 acts as a shield layer, a configuration where the cross-talk given to the reflective electrode 214 by the signal line 204 hardly occurs, is obtained.

As mentioned above, usually, it is known that the cross-talk is not recognized by human eyes when the relative difference of brightness of the neighboring pixels is equal to or smaller than 2 to 3%.

In recent years, high definition of a display apparatus has been advanced, and, accordingly, if the pixel size is not also caused to be small, the cost cannot be suppressed. However, as mentioned above, from the view point of reliability, the drive of the liquid crystal is generally a inversion driving. The power supply voltage required for the reverse drive is an order of 10 to 15 V, and the transistor and the capacitor formed on the Si substrate are required to have withstanding voltages for stably operating with respect to the power supply voltage. Therefore, even if the pixel size is small, the size where the elements are formed (for example, width of element isolation or the like) cannot be readily made small. Further, in order to obtain a pixel structure that has resistance to the cross-talk, it is desirable for the capacitor to be as large as possible.

The object of the present invention is to decrease cross-talk given to an end of a capacitor (a drain wiring, a capacitor electrode, and a reflective electrode) by a signal line by forming a switching element and a large capacitor in a limited pixel size, and, as the results, to provide a reflection type liquid crystal display apparatus which can obtain a high quality image.

The reflection type liquid crystal display apparatus of the present invention includes: a light transmitting substrate having a light transmitting electrode; a liquid crystal layer; and a substrate including a pixel which has a switching element, a capacitor and a reflective electrode, and a signal line which is connected to the capacitor and the reflective electrode via the switching element and placed on a portion above at least a part of the capacitor; and arranged so that the light transmitting electrode faces to the reflective electrode sandwiching the liquid crystal layer therebetween; where, between the capacitor and the signal line, a layer to which a fixed potential is supplied, is arranged.

Moreover, the reflection type liquid crystal display apparatus of the present invention includes: a light transmitting substrate having a light transmitting electrode; a liquid crystal layer; and semiconductor substrate including a pixel which has a switching element, a capacitor and a reflective electrode, a signal line which is connected to the capacitor and the reflective electrode via the switching element and placed on a portion above at least a part of the capacitor; and arranged so that the light transmitting electrode faces to the reflective electrode sandwiching the liquid crystal layer therebetween; where the capacitor includes a first electrode having a diffusion layer formed in the semiconductor substrate, and a second electrode having a second conductive layer arranged between the signal line and the first electrode, and the first electrode is connected to the switching element, and a fixed potential is supplied to the second electrode.

A substrate for the reflection type liquid crystal display apparatus of the present invention includes: a pixel having a switching element, a capacitor, and a reflective electrode; a signal line which is connected to the capacitor and the reflective electrode via the switching element and placed on a portion above at least a part of the capacitor; and a layer placed between the capacitor and the signal line, to which a fixed potential is supplied.

Moreover, the substrate for the reflection type liquid crystal display apparatus of the present invention includes: a semiconductor substrate including a pixel having a switching element, a capacitor, and a reflective electrode; and a signal line which is connected to the capacitor and the reflective electrode via the switching element and placed on a portion above at least a part of the capacitor; where the capacitor includes a first electrode having a diffusion layer formed on the semiconductor substrate, and a second electrode having a second conductive layer arranged between the signal line and the first electrode, and the first electrode is connected to the switching element, and a fixed potential is supplied to the second electrode.

According to the present invention, even if the pixel size is small, a large capacitance value of the capacitor can be obtained, thereby, cross-talk from the signal line to the drain wiring of the switching transistor, the capacitor electrode, and the reflective electrode, can be decreased. As the results, it is possible to provide a reflection type liquid crystal display apparatus which can obtain a good output image.

Further features of the present invention will become apparent from the following description of exemplary embodiments with reference to the attached drawings.

DESCRIPTION OF THE EMBODIMENTS

Hereinafter, embodiments of the present invention will be described in detail by using drawings.

Embodiment 1

Figure 1:
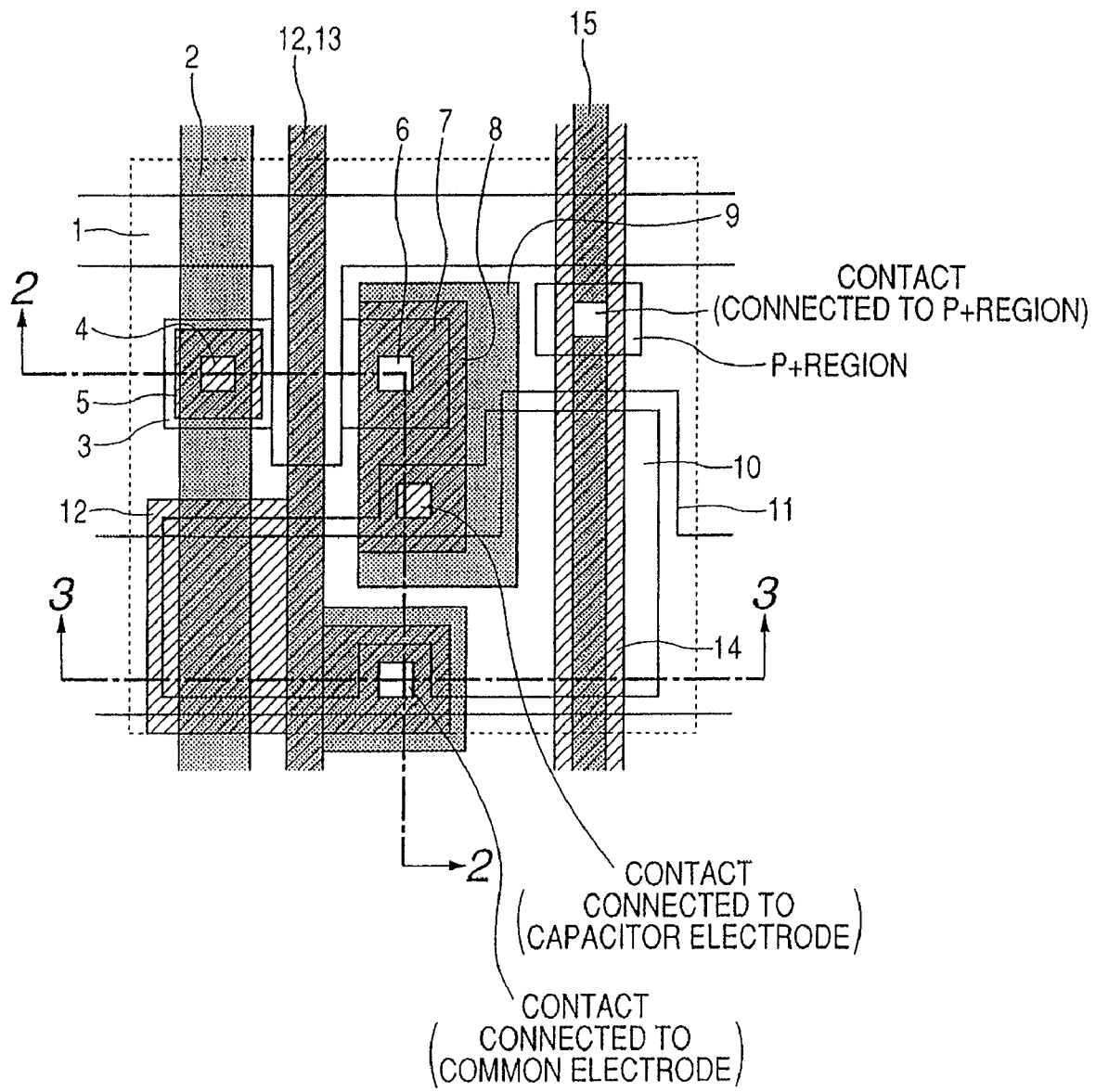
FIG. 1 is a schematic plan view of a pixel illustrating a first embodiment of the present invention.
Figure 2:
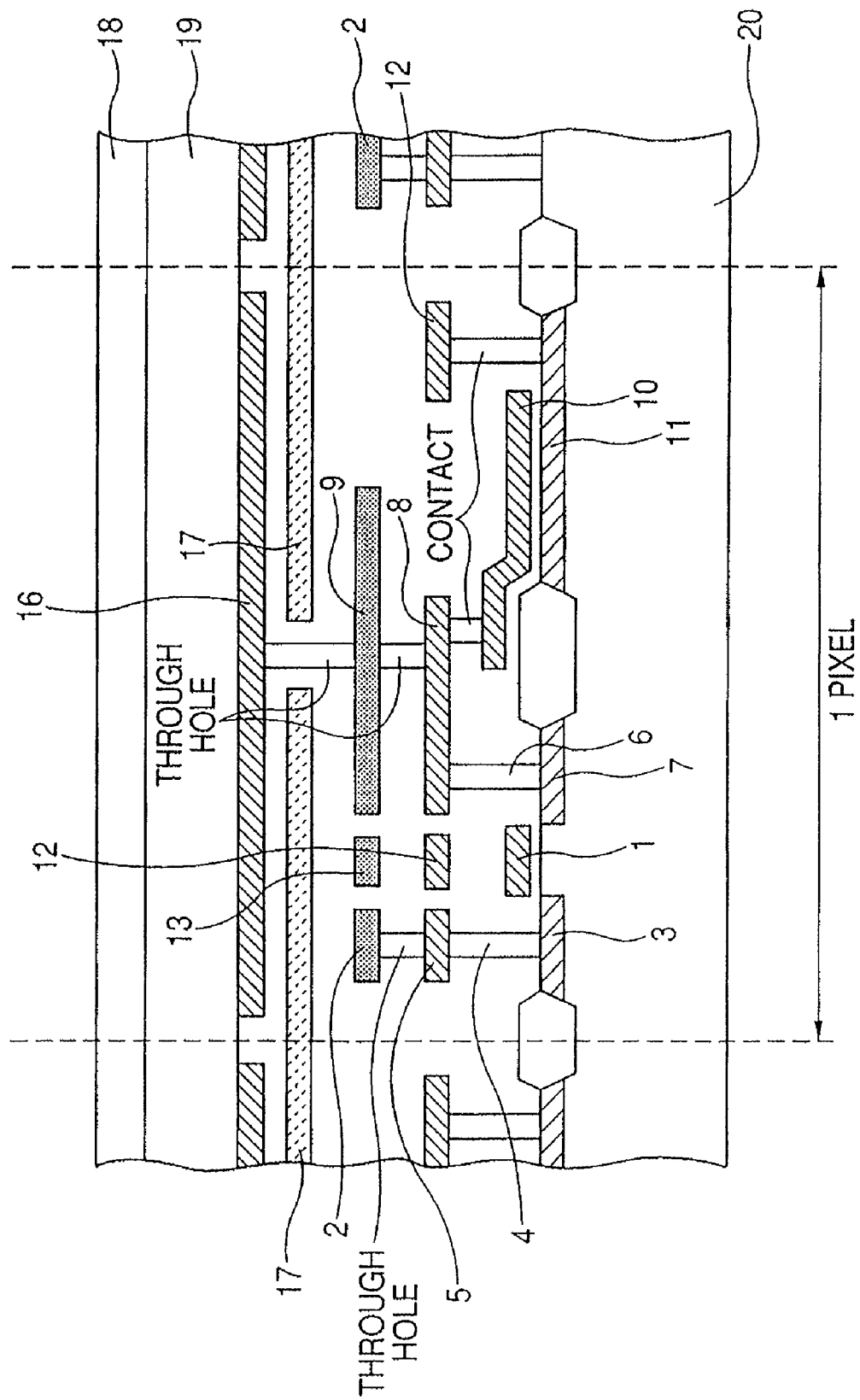
FIG. 2 is a cross-sectional view along line 2-2 in FIG. 1.
Figure 3:
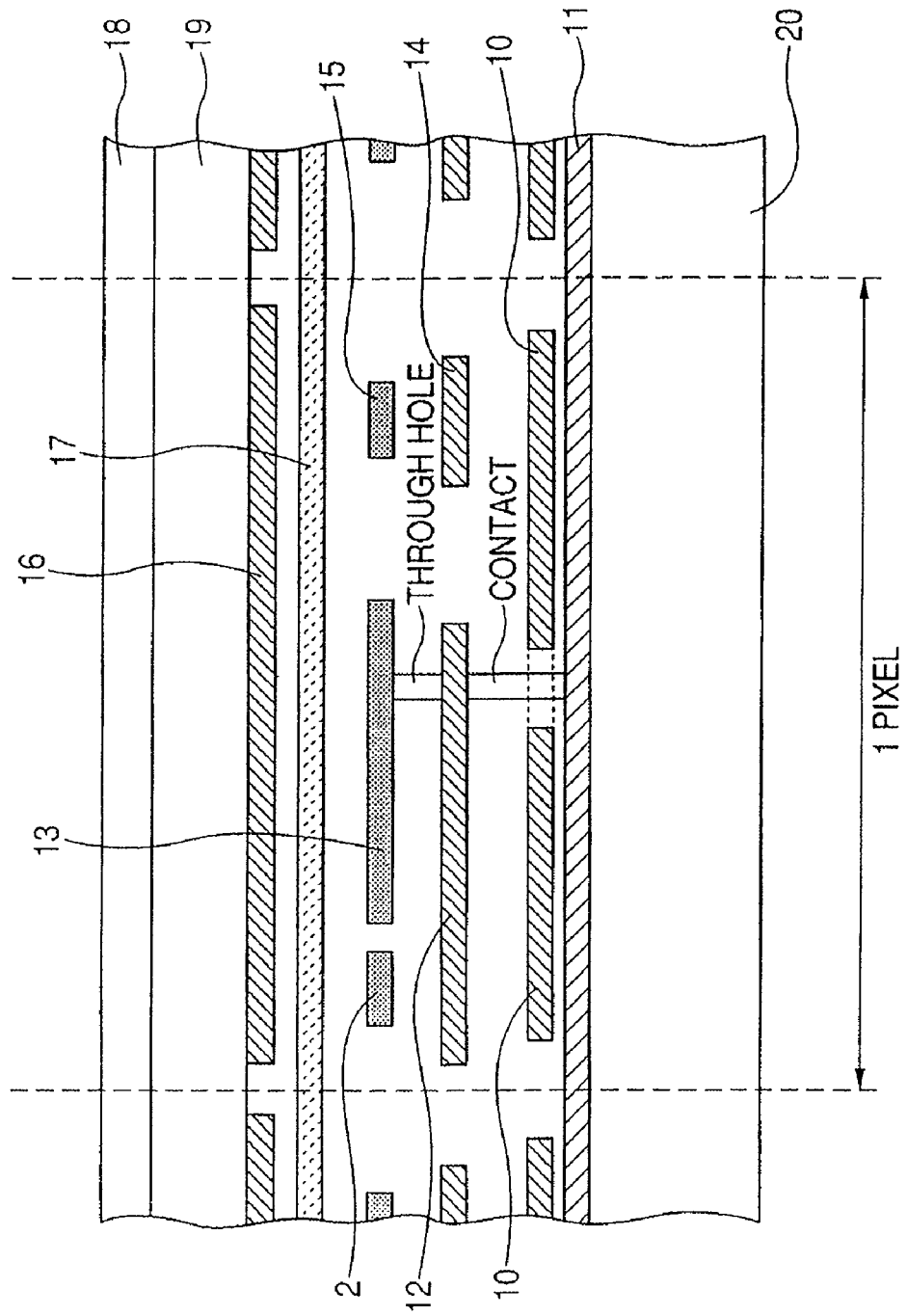
FIG. 3 is a cross-sectional view along line 3-3 in FIG. 1.
Figure 7:
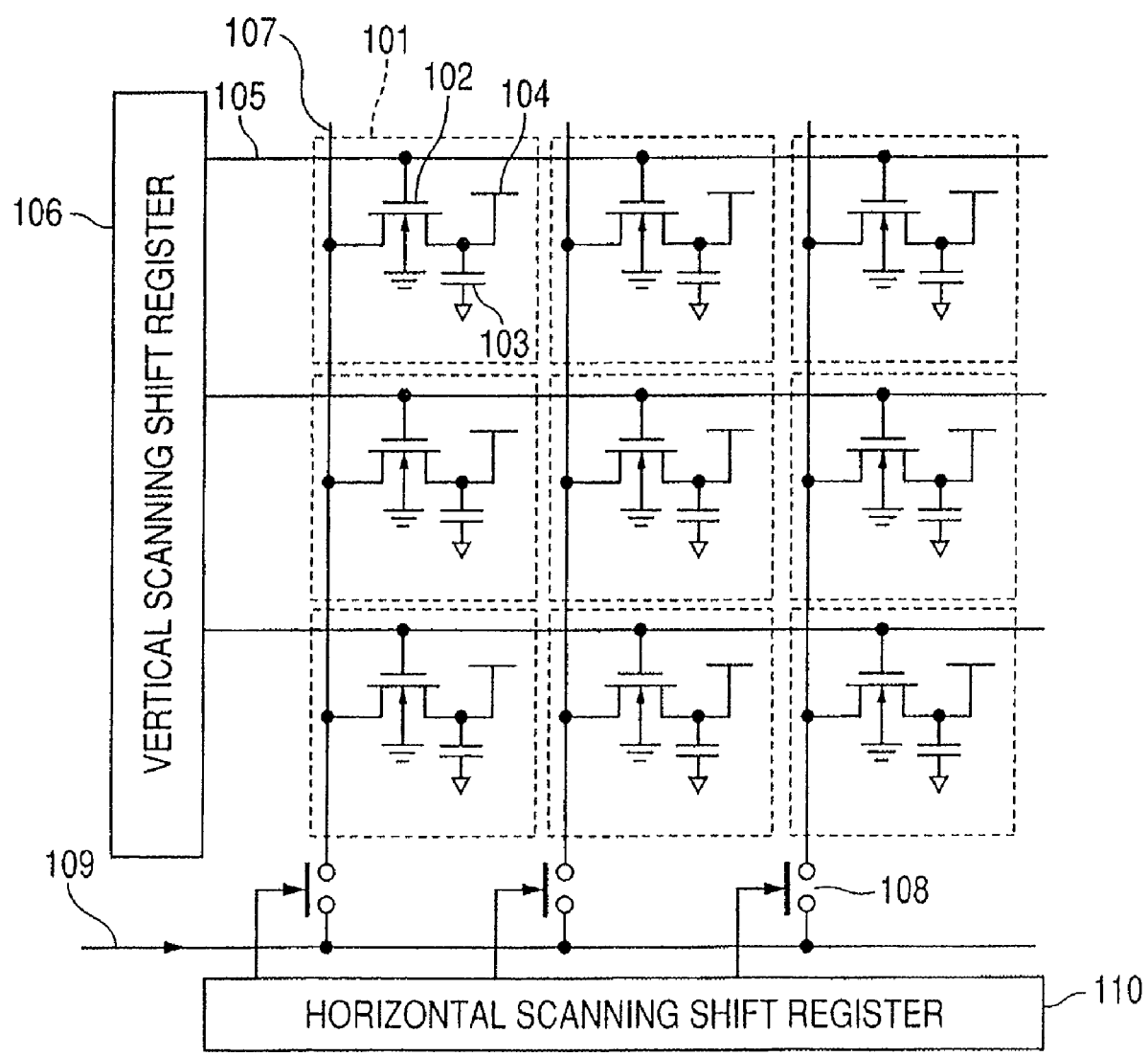
FIG. 7 is a block diagram describing an active matrix drive circuit in a reflection type liquid crystal display apparatus of the present invention.

FIG. 1 is a schematic plan view of a pixel illustrating a first embodiment of the present invention, FIG. 2 is a cross-sectional view along line 2-2 in FIG. 1, and FIG. 3 is a cross-sectional view along line 3-3 in FIG. 1. FIG. 7 is a block diagram describing a drive circuit of an active matrix in a reflection type liquid crystal display apparatus of the present invention. In addition, in FIG. 1, for ease of seeing the drawing, only the side (a reflective electrode, a light shielding layer, and a through hole connected to the reflective electrode are not included) of a Si substrate (semiconductor substrate) from a light shielding layer illustrated in FIG. 2 is described. In addition, in this embodiment, a p-type Si substrate is used as a semiconductor substrate having an active matrix drive circuit, and a switching element is assumed to be a switching transistor having an NMOS transistor. Moreover, a circuit operation as a liquid crystal display apparatus, will be described with reference to FIG. 7.

FIG. 7 is a block diagram describing an active matrix drive circuit in a reflection type liquid crystal display apparatus of the present invention, and in FIG. 7, for simplicity of description, 3×3 pixels are arranged, and circuitry of each pixel is also described.

The active matrix drive circuit illustrated in FIG. 7, is assumed to be formed on a p-type Si substrate.

In FIG. 7, a pixel 101 is illustrated. The pixel 101 is configured with a switching element 102 having a switching transistor or the like, a capacitor 103, and a reflective electrode 104. The switching element 102 in the pixel is configured with an NMOS transistor. Gates of switching elements 102 in a pixel of the same line are connected to a gate line 105, to which an output of each resistor of vertical scanning shift registers 106 is applied. Sources (the left side of an illustrated transistor) of switching elements 102 in a same column are connected to a signal line 107. A drain of the switching element 102 of each pixel is connected to one end of the capacitor 103 and the reflective electrode 104, and the other end of the capacitor 103 is connected to a Vcom potential being common to all pixels. The signal line 107 is connected to a video line via a transferring switch 108. On/off of the transferring switch 108 is controlled by each register output of horizontal scanning shift registers 110.

The operation of an active matrix drive circuit illustrated in FIG. 7, will be described briefly. Video signals sequentially input at shifted timing are output to the video line 109. Then, by sequentially turning the transferring switches 108 to be in an on-state (conduction state) using the vertical scanning shift register 110, video signal voltages are sampled and supplied to the signal line 107. The switching element of a desired pixel locating at a position where the single signal line 107 and the gate line 105 selected by the vertical scanning shift register 106 intersect each other, is selected and turned to be in on-state. Then, the video signal voltages are written in the capacitor 103 of the pixel via the switching element 102. The voltage of the reflective electrode 104 is the voltage written in the capacitor 103. Then, the potential difference created between the reflective electrode 104 and a light transmitting common electrode (not illustrated in the figure) is applied to a liquid crystal, thus resulting in change of optical properties of the liquid crystal.

In FIGS. 1 and 2, a gate line 1 formed with polysilicon (corresponding to a second electrode) is illustrated, and a part of the gate line 1 is branched and acts as the gate of a switching transistor. A signal line 2 formed with a second metal layer (corresponding to a first conductive layer) is connected to source regions 3 of the switching transistors of pixels arranged in a column direction through the source contact 4. The signal line 2 formed with the second metal layer is connected to a source wiring 5 via a through hole, which is formed with a first metal layer (corresponding to a third conductive layer) below the second metal layer, and subsequently connects the source wiring 5 and the source region 3 via the source contact 4. The drain region 7 of the switching transistor is connected to a drain wiring 8 formed with the first metal layer, via a drain contact 6. The first drain wiring 8 is connected to a second drain wiring 9 (wiring pattern) formed with the second metal layer, via the through hole. Further, similar to the prior art, the second drain wiring 9 passes through the hole in a light shielding layer 17 and is connected to a reflective electrode 16 via the trough hole. Although being not illustrated in the figure, a liquid crystal layer 19 is sandwiched between liquid crystal common electrodes 18 at a predetermined gap, which act as light transmitting electrodes formed with a light transmitting substrate acting as the counter electrode of the reflective electrode 16, after a protective film is formed on the reflective electrode 16. Where, with regard to the first and second layers, metallic material such as Al is suitably used, however, they are not limited to it, an conductive layer may be used, where electrical conduction is possible.

Moreover, the first drain wiring 8 is connected to a capacitor electrode 10 formed with polysilicon (corresponding to the second conductive layer) below the first contact, via the first contact. The capacitor electrode 10 together with a common electrode (Vcom electrode) formed with an N$^+$ type diffusion region, by sandwiching an oxide film comparable to a gate oxide film forming a switching transistor, forms the capacitor of each pixel.

At a portion above the gate electrode of the switching transistor, a first shield line 12 (acts as a shield layer) is provided between the source wiring 5 formed with the first metal layer (corresponding to the third conductive layer) and connected to the signal line 2, and the drain wiring 8 formed with the first metal layer (corresponding to the third conductive layer).

By applying a predetermined constant voltage to the first shield line 12 so as to be a fixed potential, the first shield line 12 acts as a shield so that cross-talk from the source wiring 5 to the first drain wiring 8 does not occur.

Further, at a portion above the first shield line 12, a second shield line 13 formed with the second metal layer (corresponding to the first conductive layer) is present. In addition, the shield line 13 is placed between the signal line 2 and the second drain wiring 9 formed with the signal line 2 and the second metal layer (corresponding to the first conductive layer). Similar to the first shield line 12, by being applied by a predetermined constant voltage so as to be a fixed potential, the second shield line 13 shields so that cross-talk from the signal line 2 to the second drain wiring 9 does not occur. Moreover, the first shield line 12 is connected to the common electrode 11 (N$^+$ diffusion layer) constituting a capacitor, via the second contact.

Further, as illustrated in FIG. 3, the portion above the capacitor is widely patterned so that the first shield line 12 is placed between the capacitor 10 formed with polysilicon (corresponding to the second conductive layer) and the signal line 2 formed with the second metal layer (corresponding to the first conductive layer).

By this, a portion between the signal line 2 and the capacitor electrode 10 is shielded, thereby, cross-talk from the signal line hardly affects the capacitor electrode 10.

Figure 11:
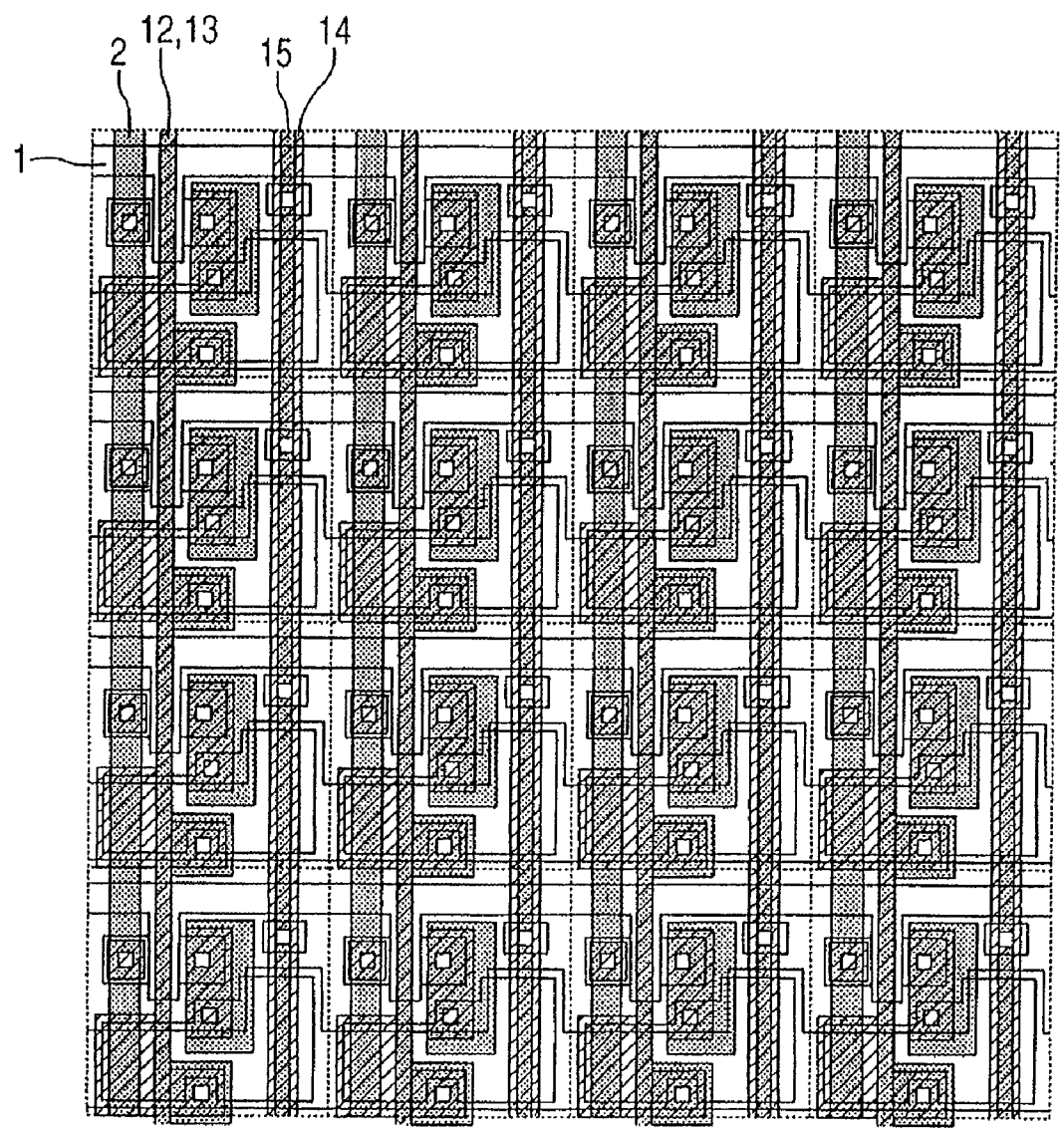
FIG. 11 is a layout view of a matrix of an example, where pixels in FIG. 1 are arranged in 4×4.

Moreover, in the right-hand side (right-hand side of a pixel) in FIG. 1, a shield line 14 formed with the first metal layer (corresponding to the third conductive layer) is placed, and, at a position where the capacitor is not formed, connected to the P$^+$ region via a third contact so as to be the potential of a p type Si substrate. Further, as illustrated in FIGS. 1 and 3, at a portion above the shield line 14, a shield line 15 formed with the second metal layer (corresponding to the first conductive layer) is placed. By this, the shield line 14 acts as a shield to the source wirings 5 of neighboring pixels, and the shield line 15 acts as a shield to the signal lines of neighboring pixels. In FIG. 11, a plurality of pixels illustrated in FIG. 1 is arranged in a 4×4 matrix. In this embodiment, all pixels are arranged in substantially same direction. As illustrated in FIG. 11, between the signal line 2 and the drain line 9 of a predetermined pixel, the shield line 13 of the pixel is placed. Moreover, between the signal line 2 and the drain wiring 9 of a neighboring pixel of the predetermined pixel, the shield line 15 of the neighboring pixel is placed. Further, between the source wiring 5 and the drain wiring 8 of a predetermined pixel, the shield line 12 is placed, and between the source wiring 5 and the drain wiring 8 of a neighboring pixel of the predetermined pixel, the shield line 14 is placed. By such a configuration, it is possible to decrease the occurrence of cross-talk. Moreover, since regions from the reflective electrode 16 where a liquid crystal layer is sealed, to the liquid crystal common electrode has the same structure as the structure of prior art, description thereof will be omitted.

Figure 12:
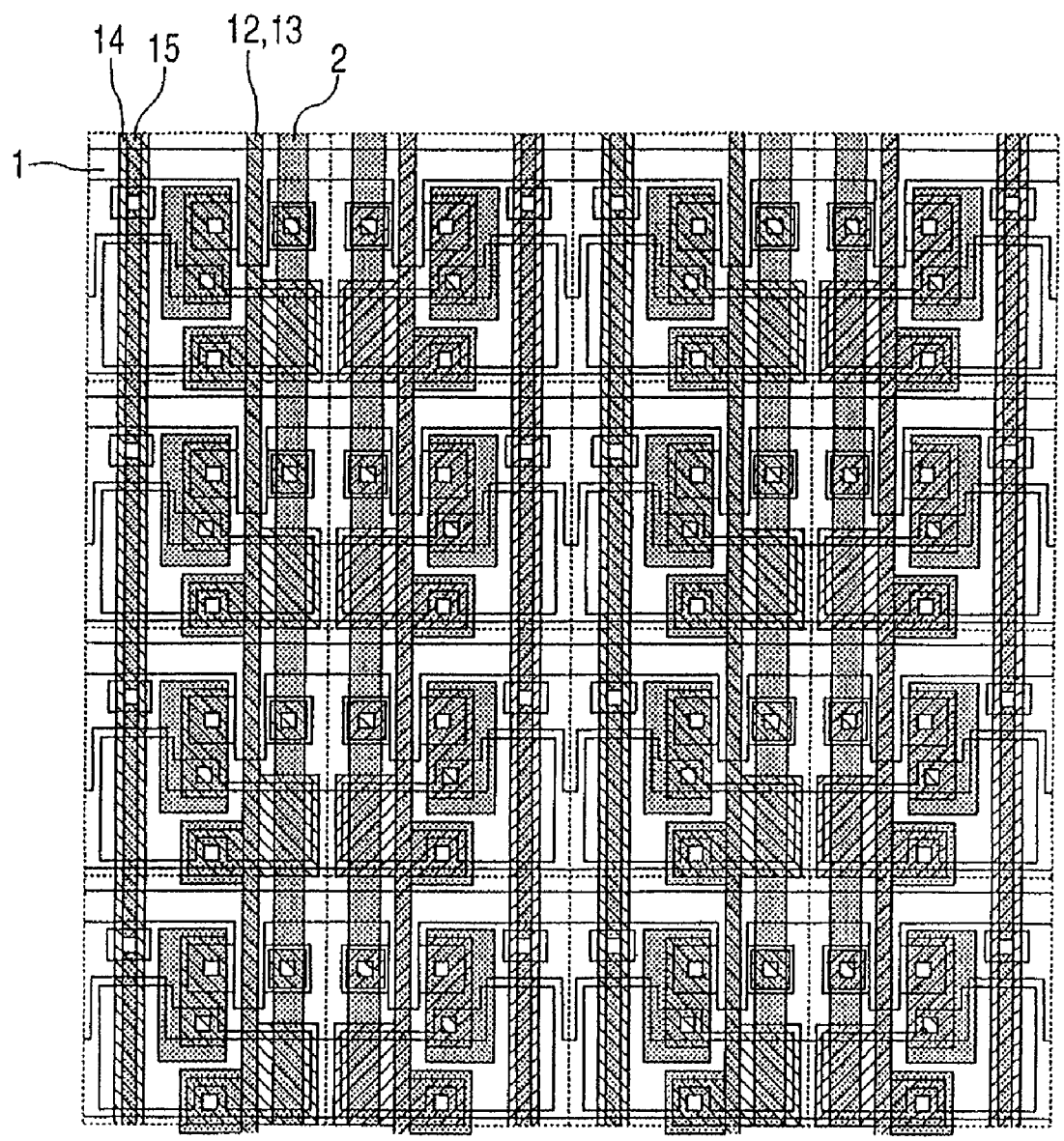
FIG. 12 is a layout view of a matrix of another example, where pixels in FIG. 1 are arranged in 4×4.
Figure 13:
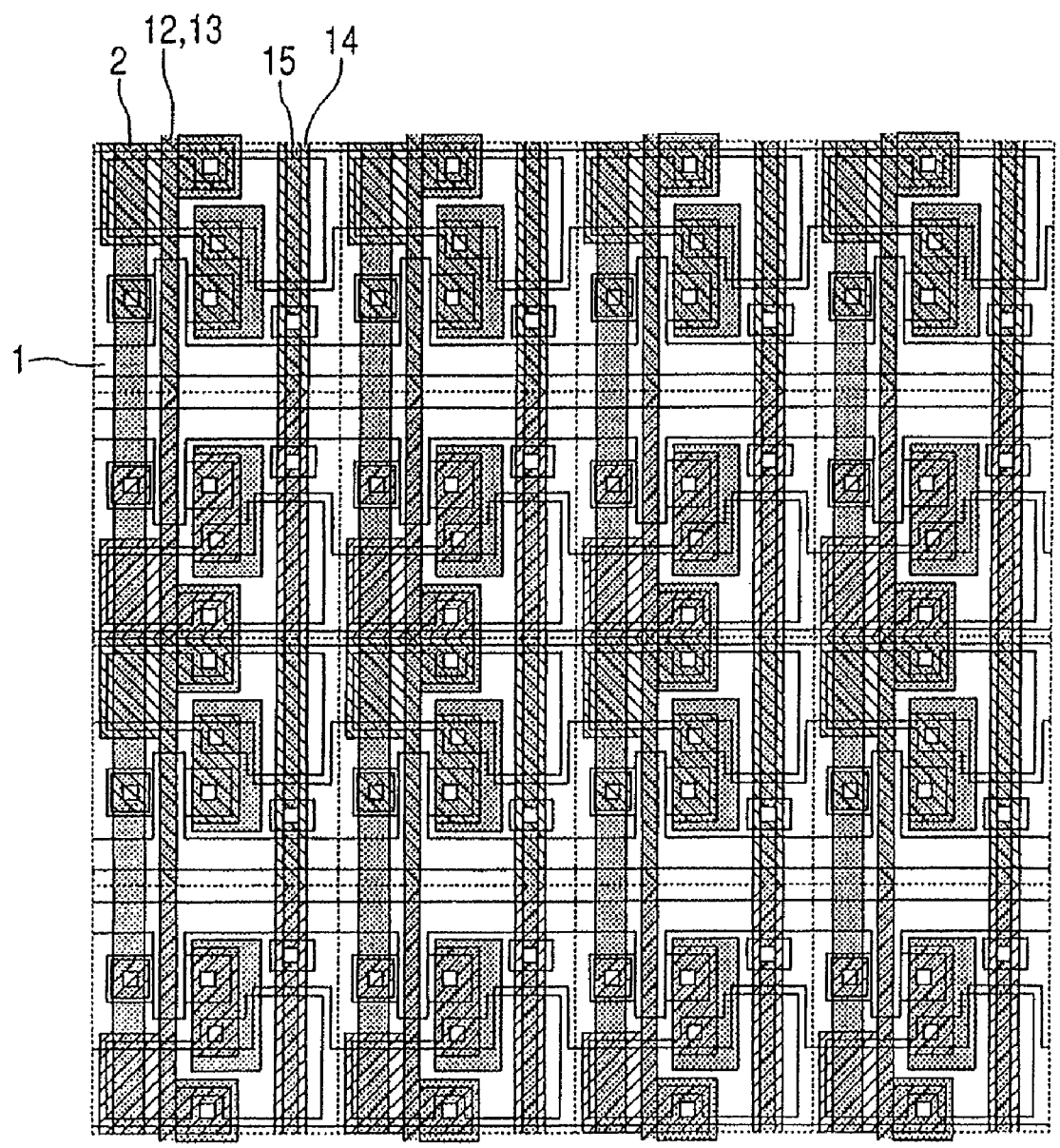
FIG. 13 is a layout view of a matrix of another example, where pixels in FIG. 1 are arranged in 4×4.
Figure 14:
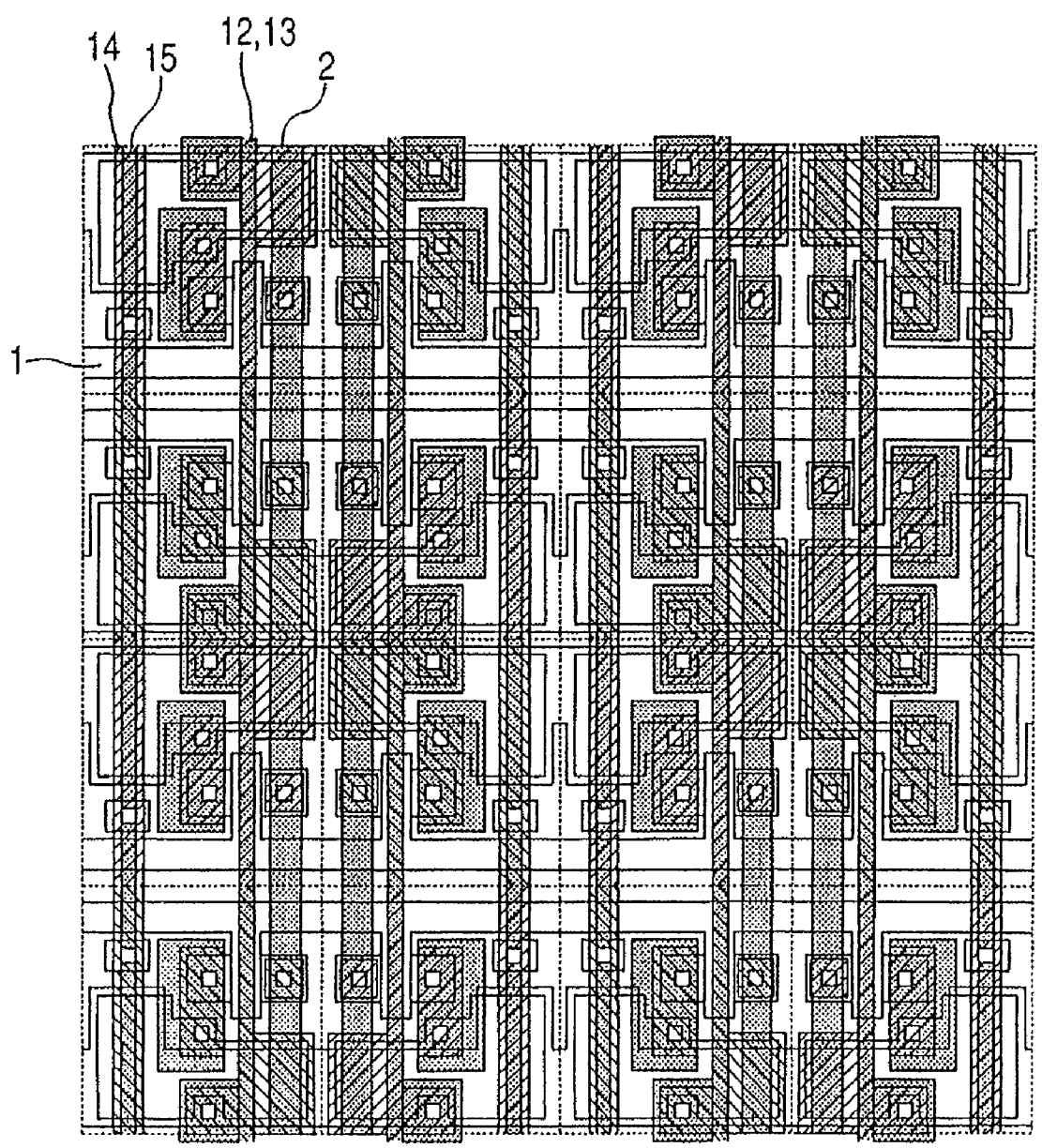
FIG. 14 is a layout view of a matrix of another example, where pixels in FIG. 1 are arranged in 4×4.

In addition, in this embodiment, the matrix layout of pixels is not limited to the layout illustrated in FIG. 11, for example, matrices illustrated in FIGS. 12 to 14, are also suitably applicable.

In FIG. 12, a plurality of pixels illustrated in FIG. 1 is arranged in a 4×4 matrix. In FIG. 12, pixels in odd columns and pixels in even columns are arranged so that they are in line symmetry in horizontal direction (lateral direction in the figure). When this configuration is used, it is required for pixel voltages to be written every 2N pixels (where N is a positive integer) simultaneously. In the configuration illustrated in FIG. 12, between the signal line 2 and the drain wiring 9, the shield line 13 or the shield line 15 is also placed. Moreover, between the source wiring 5 and the drain wiring 8, the shield line 12 or the shield line 14 is also placed. By these configurations, occurrence of the cross-talk can be decreased.

In FIG. 13, a plurality of pixels illustrated in FIG. 1 is also arranged in a 4×4 matrix. In FIG. 13, pixels in odd columns and pixels in even columns are arranged so that they are in line symmetry in vertical direction (longitudinal direction in the figure). In the configuration illustrated in FIG. 13, between the signal line 2 and the drain wiring 9, the shield line 13 or the shield line 15 is also placed. Moreover, between the source wiring 5 and the drain wiring 8, the shield line 12 or the shield line 14 is also placed. By these configurations, occurrence of the cross-talk can be decreased.

In FIG. 14, a plurality of pixels illustrated in FIG. 1 is also arranged in a 4×4 matrix. In FIG. 14, pixels in odd columns and pixels in even columns are arranged so that they are in line-symmetry in horizontal direction (lateral direction in the figure) and in line-symmetry in vertical direction (longitudinal direction in the figure). When this configuration is used, similar to the configuration illustrated in FIG. 12, it is required for pixel voltages to be written every 2N pixels (where N is a positive integer) simultaneously. In the configuration illustrated in FIG. 14, between the signal line 2 and the drain wiring 9, the shield line 13 or the shield line 15 is also placed. Moreover, between the source wiring 5 and the drain wiring 8, the shield line 12 or the shield line 14 is also placed. By these configurations, occurrence of the cross-talk can be decreased.

Here, the matrix layout of pixels is not limited to the layout illustrated in this embodiment, it is also suitably applicable to other embodiments of the present invention.

In addition, in regions among respective layers (such as electrode and wiring) illustrated in FIGS. 2 and 3 not described in particular, insulating layers are placed.

Further, although the reflective electrode 16 also forms one end of the capacitor, the light shielding layer 17 is placed between the signal line 2 and the reflective electrode 16. Since, a predetermined constant voltage is applied to the light shielding layer 17 to be a fixed potential, the light shielding layer 17 acts as a shield layer, thus, resulting in suppression of effect of cross-talk from the signal line 2 to the reflective electrode 16. Moreover, by applying the constant voltage to the light shielding layer 17, the portion between the reflective electrode 16 and the light shielding layer 17 can be also used as the capacitor.

As mentioned above, by using the pixel layout illustrated in this embodiment, a wiring pattern with predetermined constant voltages in the vertical and horizontal directions of the signal line, is arranged. By this configuration, since the signal line is shielded in four directions (in vertical directions and in horizontal directions), and the portion below the signal line can be also effectively formed as the capacitor, the capacitance value can be large. Further, since cross-talk given to the drain wiring, the capacitor electrode and the reflective electrode can be decreased, even when the pixel size is small, a good output image can be obtained.

Moreover, in this embodiment, an example using a p type Si substrate is described, however, an n type Si substrate may also be used, and even when either substrate is used, effects according to this embodiment does not change.

Furthermore, in this embodiment, as the gate line, polysilicon is used; however, the gate line is not necessarily to be polysilicon. Thus, a configuration may be used, where the gate line is formed by using the first metal layer, and, at a required position, connected to polysilicon via a contact, and the polysilicon constitutes the gate of a switching transistor.

Embodiment 2

Figure 4:
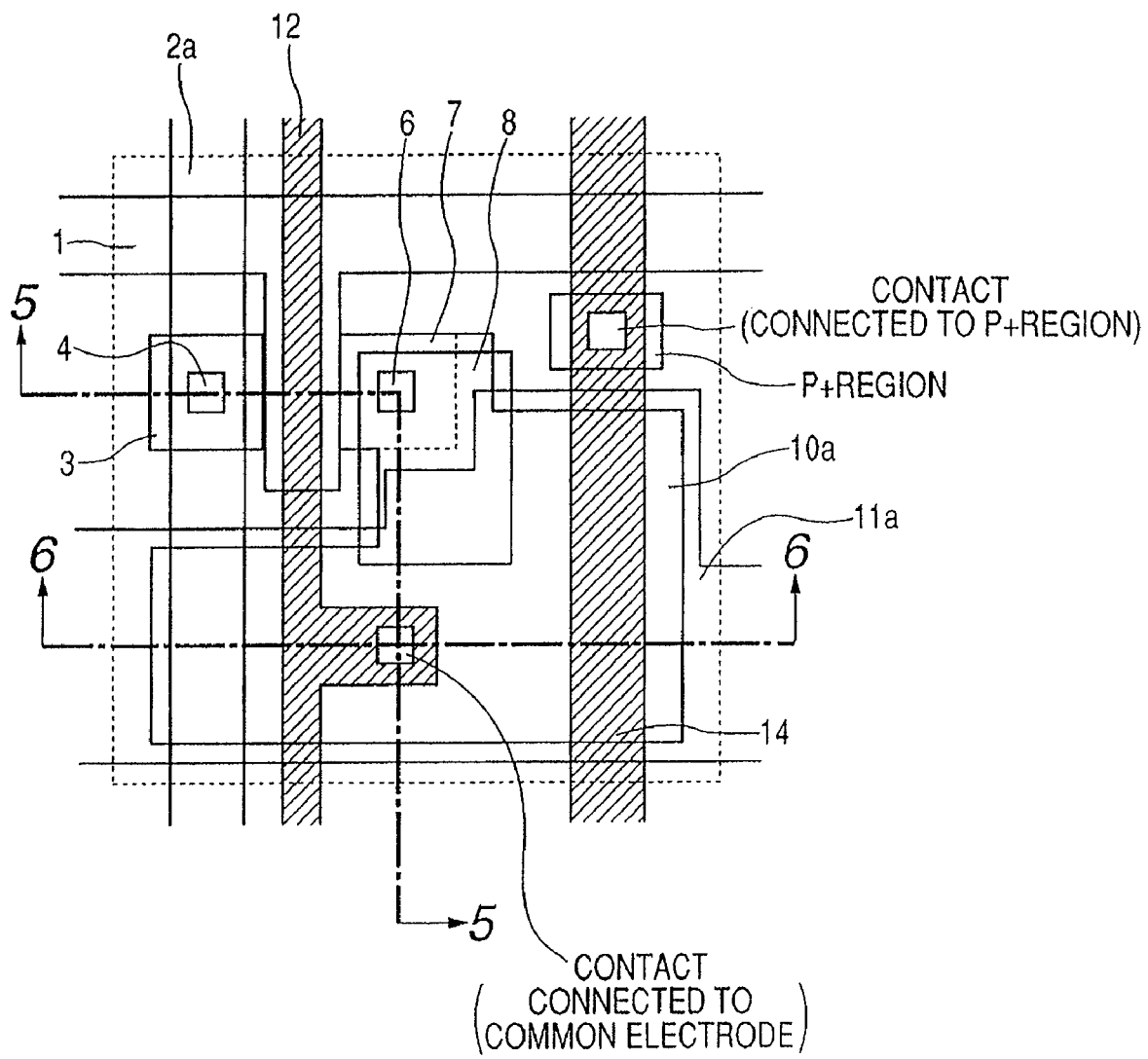
FIG. 4 is a schematic plan view of a pixel illustrating a second embodiment of the present invention.
Figure 5:
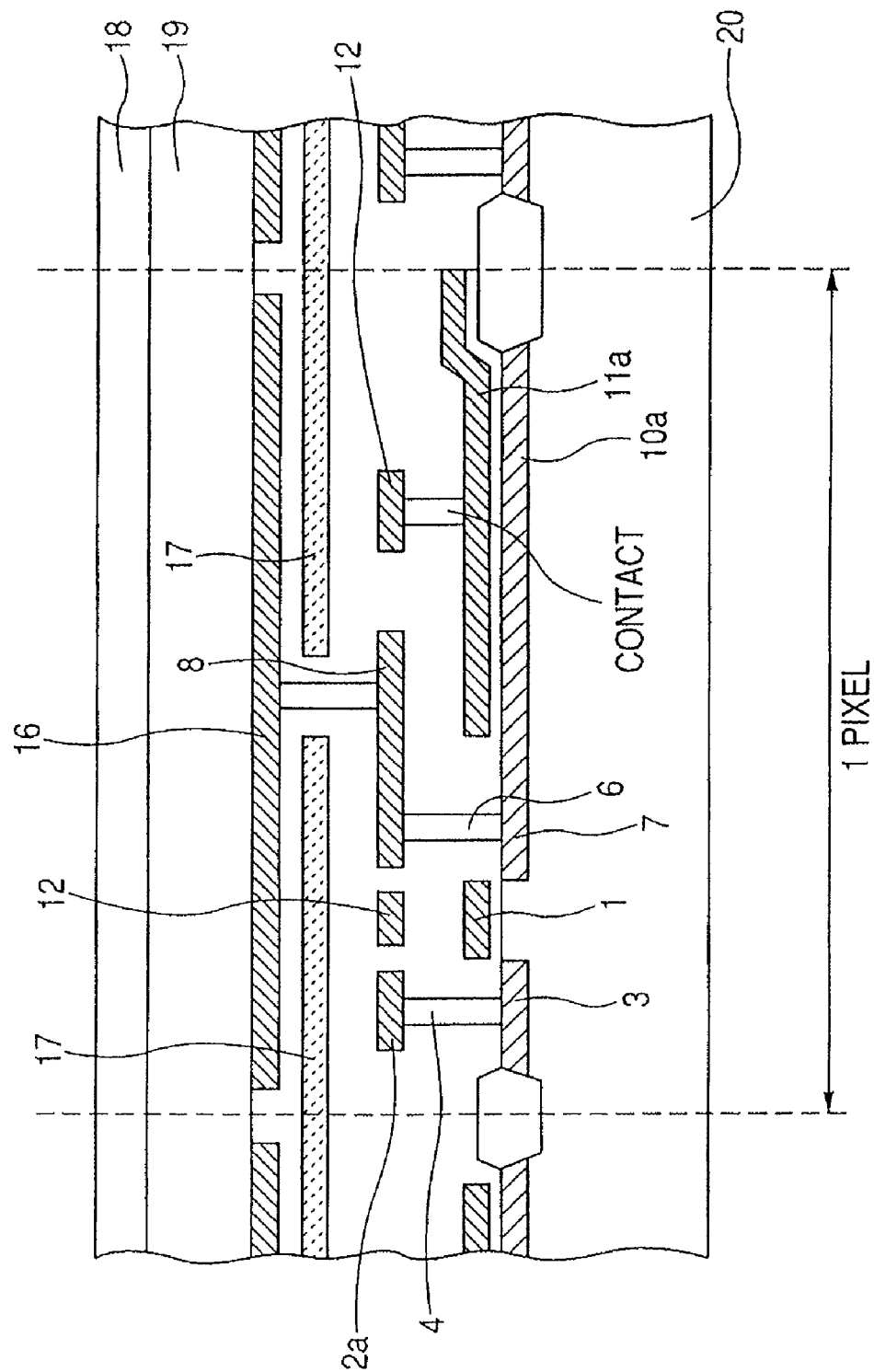
FIG. 5 is a cross-sectional view along line 5-5 in FIG. 4.
Figure 6:
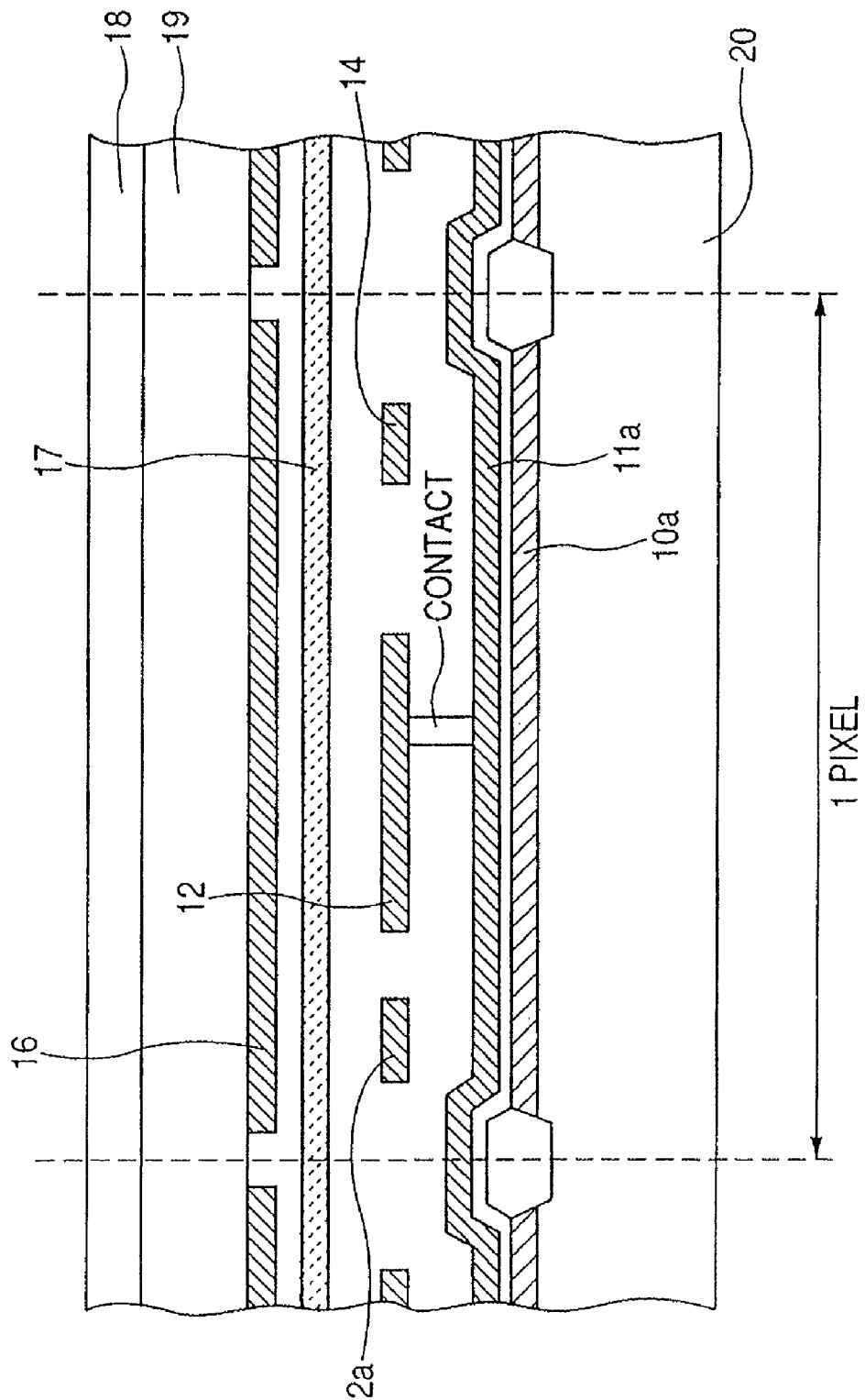
FIG. 6 is a cross-sectional view along line 6-6 in FIG. 4.

FIG. 4 is a schematic plan view illustrating a second embodiment of the present invention, and FIG. 5 is a cross-sectional view in along line 5-5 in FIG. 4. Moreover, FIG. 6 is a cross-sectional view in along line 6-6 in FIG. 4.

The main difference between this embodiment and the first embodiment is in that an electrode having an $N^+$ type diffusion layer, which is the first electrode of the capacitor, is brought into contact to the drain region of a switching transistor, and connected to the drain wiring and the reflective electrode, and, in that the common electrode, which is the second electrode forming the capacitor, is formed with polysilicon and connected to a shield line. In this embodiment, a layer corresponding to the second metal layer in Embodiment 1 is not necessary.

Hereinafter, the pixel layout and the cross-sectional structure illustrated in FIG. 4 will be described.

A part of a gate line 1 formed with polysilicon is branched and acts the gate of a pixel switching transistor. A signal line 2a formed with the first metal layer is connected to the source regions 3 of switching transistors of pixels arranged in a column direction via a source contact 4. The drain region 7 of the switching transistor is connected to the drain wiring 8 formed with the first metal layer via a drain contact 6, and the drain wiring 8 is connected to the reflective electrode 16 via a through hole.

Moreover, without requiring element isolation between a transistor and a capacitor, the drain region 7 is connected to a capacitor electrode 10a formed with an $N^+$ diffusion layer, in the extension of the diffusion region. The capacitor electrode 10a together with a common electrode 11a (Vcom electrode) formed with polysilicon, by sandwiching an oxide film comparable to a gate oxide film forming a switching transistor, forms the capacitor of each pixel.

At a portion above the gate electrode (a part of the gate wiring) of the switching transistor, the shield line 12 formed with the first metal layer is present, and the shield line 12 is placed between the signal line 2a and the drain wiring 8 formed with the first metal layer. By being applied with a predetermined constant voltage, the shield line 12 shields so that cross-talk from the signal line 2 to the drain wiring 8 does not occur. The shield line 12 is connected to the common electrode 11a constituting a capacitor, via a contact.

Further, the common electrode 11a formed with polysilicon is placed between the signal line 2 formed with the first metal layer and the capacitor electrode formed with an $N^+$ diffusion region. Therefore, the portion between the signal line 2 and the capacitor electrode 10a is shielded, and, thereby, there is no influence of not affected by the cross-talk from the signal line.

Moreover, in the right-hand side (right-hand side of a pixel) in FIG. 4, a GND shield line 14 formed with the first metal layer is placed, and, at a position where the capacitor is not formed, connected to the $P^+$ region via a contact so as to be the potential of a p-type Si substrate. By this, the GND shield line 14 acts as a shield to the signal lines of neighboring pixels. Moreover, since the light shielding layer 17, similar to the case in Embodiment 1, is placed with a desired constant potential, there is no cross-talk affected by the signal line 2 to the reflective electrode 16. Moreover, since regions from the reflective electrode 16 where a liquid crystal layer 19 is sealed, to the liquid crystal common electrode 18 has the same structure as in Embodiment 1, description thereof will be omitted.

In addition, in regions among respective layers (such as electrode and wiring) illustrated in FIGS. 5 and 6 not described in particular, insulating layers are placed.

As mentioned above, by using the pixel layout illustrated in this embodiment, a wiring pattern with predetermined constant voltages in the vertical and horizontal directions of the signal line, is arranged. As the results, since the signal line is shielded from four directions (in vertical directions and in horizontal directions), and the portion below the signal line can be also effectively formed as the capacitor, the capacitance value can be large. Further, since cross-talk given to the drain wiring, the capacitor electrode and the reflective electrode can be decreased, even when the pixel size is small, a good output image can be obtained.

Moreover, in this embodiment, an example using a p type Si substrate is described, however, an n type Si substrate may also be used, and even when either substrate is used, effects demonstrated by the present embodiment does not change.

In addition, in the configuration of the present embodiment, the present invention can be achieved even if the number of metal layers is less by one than the number of the configuration of the first embodiment.

Embodiment 3

Figure 8:
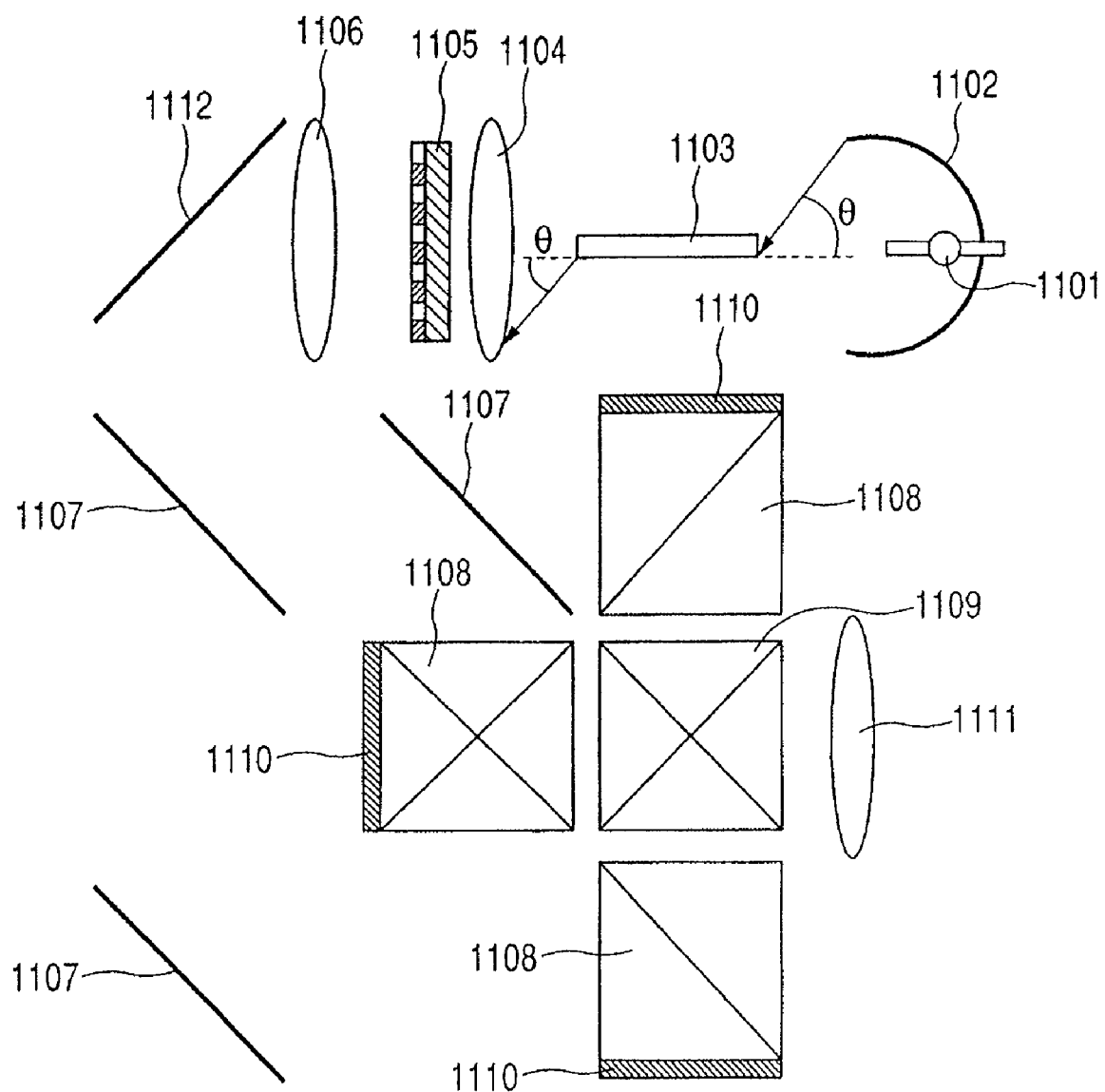
FIG. 8 is a view illustrating a liquid crystal projector system.
Figure 9:
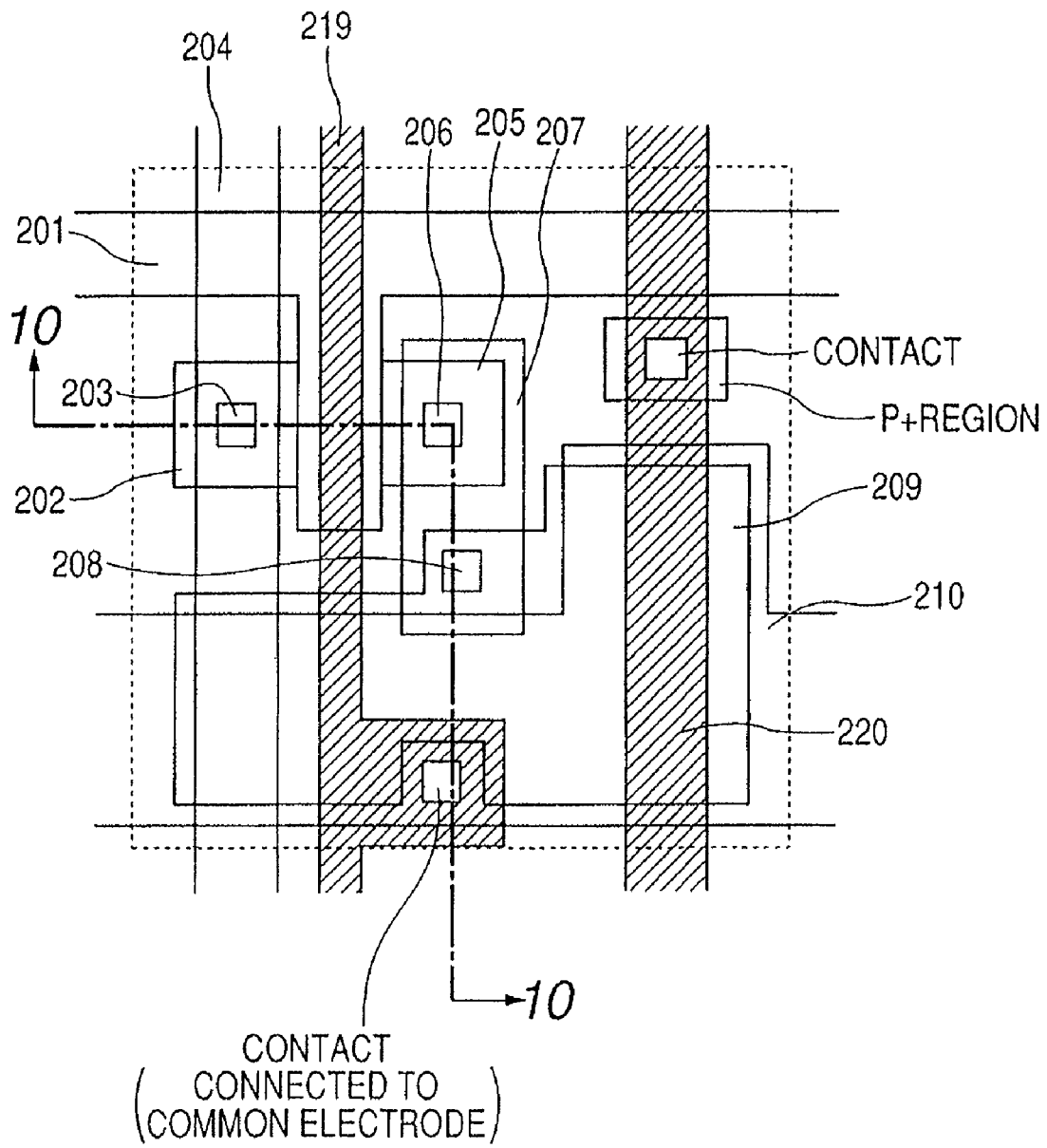
FIG. 9 is a schematic plan view of a prior art pixel.
Figure 10:
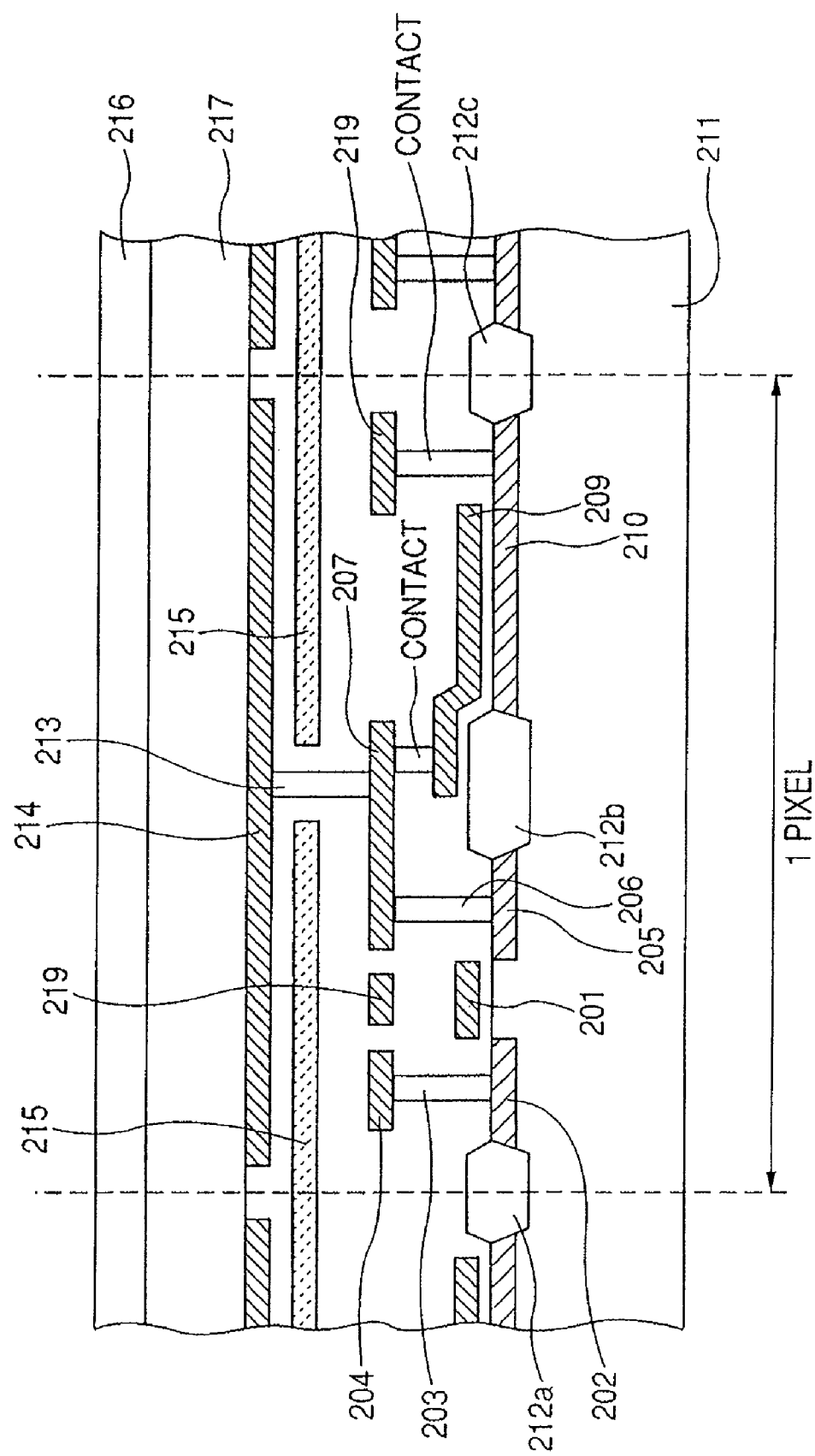
FIG. 10 is a cross-sectional view along line 10-10 in FIG. 9.

Now, with reference to FIG. 8, a liquid crystal projector system using a reflection type liquid crystal display apparatus which uses an active matrix substrate of the present invention, will be described. In FIG. 8, an example of an optical system for a liquid crystal projector is illustrated. A lump 1101, a reflector 1102, a rod integrator 1103, a collimater lens 1104, a polarization converting system 1105, a relay lens 1106, and a dichroic mirror 1107 are illustrated. Moreover, a polarization beam splitter 1108, a cross-prism 1109, a reflection type liquid crystal panel using an active matrix substrate of the present invention 1110, a projection lens 1111, and a total reflection mirror 1112 are illustrated.

Light flux emitted from the lamp 1101 is reflected by the reflector 1102, and focused in the entrance of the integrator 1103. The reflector 1103 is an elliptic reflector and its focal points are present in a light emitting part and the entrance of the integrator. The light flux entered the integrator 1103 is reflected for 0 to several times in the integrator, and forms a secondary light source image in the exit of the integrator. Although, as a method for forming the secondary light source, there is a method using a fly eye, here it is eliminated. The light flux from the secondary light source is caused to be substantially parallel lights through the collimater lens 1104 and enters the polarization beam splitter 1105 of the polarization converting system. P waves are reflected by the polarization beam splitter 1105, passed through a λ/2 plate to become an S wave, and all of them become S waves and enter the relay lens 1106. The light flux is condensed in a panel by the relay lens 1106. While condensing the light flux in the panel, a color decomposition system is constituted by a color decomposition dichroic mirror 1107, a polarizing plate (not illustrated in the figure), the polarization beam splitter 108, and the cross-prism 1109 etc., and S waves enter three liquid crystal panels 1110. In the liquid crystal panel 1110, a liquid crystal shutter controls the voltage in each pixel while synchronizing to the picture image. A mode where an S wave is modulated into an elliptically polarized light (or a linearly polarized light) by the operation of the liquid crystal, the P wave component is transmitted by the polarization beam splitter 1108, a color thereof is synthesized by the cross prism 1109, and, subsequently, is projected from the projection lens 1111, is general.

The present invention can be applied to a reflection type liquid crystal display apparatus, a substrate for the reflection type liquid crystal display apparatus, and a liquid crystal projector system displaying an image and a character using a liquid crystal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-123411, filed Apr. 27, 2006, and 2007-106059 filed Apr. 13, 2007 which are hereby incorporated by reference herein in their entirety.

What is claimed is:

1. A reflection type liquid crystal display apparatus comprising:
    a light transmitting substrate having a light transmitting electrode;
    a liquid crystal layer; and
    a semiconductor substrate having pixels, each of which has a switching element, a capacitor and a reflective electrode, and having a signal line connected to the capacitor and the reflective electrode via the switching element and placed above at least a part of the capacitor, the light transmitting electrode facing the reflective electrode to sandwich the liquid crystal layer therebetween,
    wherein the signal line is formed by a first conductive layer;
    the capacitor includes a first electrode having a diffusion layer formed in the semiconductor substrate, and a second electrode is formed by a second conductive layer which is an underling layer with respect to the first conductive layer; and
    a first shield line, to which a fixed potential is supplied, is arranged between the first conductive layer and the second conductive layer, and the first shield line is arranged in a region in which the signal line is arranged above at least a part of the capacitor.

2. The reflection type liquid crystal display apparatus according to claim 1, wherein
    the switching element and the reflective electrode are connected via a wiring pattern;
    the wiring pattern is formed of the first conductive layer, and the material of the wiring pattern is the same material as the material of the signal line; and
    a second shield line which is formed of the first conductive layer and to which a fixed potential is supplied, is placed between the signal line and the wiring pattern.

3. The reflection type liquid crystal display apparatus according to claim 2, wherein the plurality of pixels is arranged in a matrix, and, between wiring pattern of a neighboring pixel and the signal line, a second shield line of the neighboring pixel which is formed of the first conductive layer and to which a fixed potential is supplied is placed.

4. The reflection type liquid crystal display apparatus according to any one of claims 1 to 3, wherein, between the reflective electrode and the signal line, a light shielding layer to which a fixed potential is supplied, is placed.

5. The reflection type liquid crystal display apparatus according to claim 2, wherein the first shield line and the second shield line are connected via a through hole.

6. The reflection type liquid crystal display apparatus according to claim 1, wherein the fixed potential supplied to the third conductive layer is the same potential as the fixed potential supplied to the diffusion layer.

7. A liquid crystal projector system comprising the reflection type liquid crystal display apparatus according to claim 1.

8. A semiconductor substrate for a reflection type liquid crystal display apparatus used in a reflection type liquid crystal display apparatus comprising:
    a pixel having a switching element, a capacitor, and a reflective electrode;

a signal line which is connected to the capacitor and the reflective electrode via the switching element and placed above at least a part of the capacitor, wherein the signal line is formed by a first conductive layer;

the capacitor includes a first electrode having a diffusion layer formed in the semiconductor substrate, and a second electrode is formed by a second conductive layer which is an underling layer with respect to the first conductive layer; and a first shield line, to which a fixed potential is supplied, is arranged between the first conductive layer and the second conductive layer, and the first shield line is arranged in a region in which the signal line is arranged above at least a part of the capacitor.

9. A reflection type liquid crystal display apparatus comprising:

a light transmitting substrate having a light transmitting electrode;

a liquid crystal layer; and a semiconductor substrate having pixels, each of which has a switching element, a capacitor and a reflective electrode, and having a signal line connected to the capacitor and the reflective electrode via the switching element and placed above at least a part of the capacitor, the light transmitting electrode facing the reflective electrode to sandwich the liquid crystal layer therebetween, wherein the capacitor includes a first electrode and a second electrode which is arranged between the signal line and the first electrode and is connected to the signal line via the switching element; and wherein a first shield line, to which a fixed potential is supplied, is arranged between signal line and the second electrode.

10. The reflection type liquid crystal display apparatus according to claim 9, wherein the switching element and the reflective electrode are connected via a wiring pattern; and a second shield line is placed between the signal line and the wiring pattern.

11. The reflection type liquid crystal display apparatus according to claim 10, wherein the plurality of pixels is arranged in a matrix, and, between wiring pattern of a neighboring pixel and the signal line, a second shield line of the neighboring pixel which is formed of the same material as that of the signal line and to which a fixed potential is supplied is placed.

12. The reflection type liquid crystal display apparatus according to any one of claims 9 to 11, wherein, between the reflective electrode and the signal line, a light shielding layer to which a fixed potential is supplied, is placed.

13. The reflection type liquid crystal display apparatus according to claim 10, wherein the first shield line and the second shield line are connected via a through hole.

14. The reflection type liquid crystal display apparatus according to claim 9, wherein the fixed potential supplied to the first shield line is supplied to the first electrode.

15. A liquid crystal projector system comprising the reflection type liquid crystal display apparatus according to claim 9.

16. A substrate for a reflection type liquid crystal display apparatus used in a reflection type liquid crystal display apparatus comprising:

a semiconductor substrate having pixels, each of which has a switching element, a capacitor, and a reflective electrode;

a signal line connected to the capacitor and the reflective electrode via the switching element and placed above at least a part of the capacitor, wherein the capacitor includes a first electrode and a second electrode which is arranged between the signal line and the first electrode and is connected to the signal line via the switching element; and wherein a first shield line, to which a fixed potential is supplied, is arranged between the signal line and the second electrode.

17. The reflection type liquid crystal display apparatus according to claim 9, wherein the first electrode is a diffusion layer formed in the semiconductor substrate.

18. The semiconductor substrate according to claim 16, wherein the first electrode is a diffusion layer formed in the semiconductor substrate.

* * * * *